United States Patent [19]

Sakai

[11] Patent Number: 4,633,300
[45] Date of Patent: Dec. 30, 1986

[54] COLOR INFORMATION DETECTING DEVICE

[75] Inventor: Shinji Sakai, Kanagawa, Japan

[73] Assignee: Canon Kabushiki Kaisha

[21] Appl. No.: 662,258

[22] Filed: Oct. 18, 1984

[30] Foreign Application Priority Data

Oct. 21, 1983 [JP] Japan ................. 58-197753

[51] Int. Cl.⁴ .............................................. H04N 9/04
[52] U.S. Cl. ......................................... 358/41; 358/29
[58] Field of Search ..................................... 358/41, 29

[56] References Cited

U.S. PATENT DOCUMENTS 375,158  8/1873  Metzger ................................. 358/41

FOREIGN PATENT DOCUMENTS 322835 12/1983 Fed. Rep. of Germany ........ 358/29

Primary Examiner—Michael A. Masinick
Assistant Examiner—Robert M. Bauer
Attorney, Agent, or Firm—Toren, McGeady, Stanger, Goldberg & Kiel

[57] ABSTRACT

The disclosed color information detecting device is constructed of detectors each for detecting a one of a number of different colors and each having a number of light receiving faces. The detectors are arranged on the same plane independently of each other. The light receiving faces of each detector are electrically connected and have their center of sensitivity distribution located at about the same point as that of the faces of another detector.

29 Claims, 7 Drawing Figures

COLOR INFORMATION DETECTING DEVICE

BACKGROUND OF THE INVENTION

1. Field of the Invention

This invention relates to a color information detecting device for detecting, for example, color temperature information.

2. Description of the Prior Art

Conventional image sensing devices such as video cameras, etc., control white light balance by having the gains of amplifiers disposed within different color or chroma signal channels preset to bring chroma signal components into a ratio of 1:1. This is accomplished either by attaching a white cap to the lens of the camera or by directing the lens of the camera toward a white object. These white balance control methods, however, degrade the operability of the camera to a great degree.

To solve this problem, proposals have been made to use a color temperature detector arranged to constantly detect the color temperature of an object to be photographed. The gain of each color or chroma signal channel is adjusted as necessary on the basis of the output of this color temperature detector. The color temperature detector uses, for example, an R sensor for detecting the red (R) component of light coming from an object and a B sensor for detecting the blue (B) component of the light. The color temperature detector obtains color temperature information from the ratio of the outputs of the two sensors. The operation of the color temperature detector is based on the premise that the ratio of the R and B signals thus obtained corresponds to the color temperature as a single-valued function. However, in this conventional color temperature detector, the R and B sensors must be arranged to receive the light from the same light source in the same manner. This requirement has necessitated overlapping the two sensors in a multilayer form. More specifically, for example, an n-type silicon layer, a p-type silicon layer, and an n-type silicon layer, are dispersed on a semiconductor substrate. Electric charges corresponding to light incident on the junctions between them are read out. Red and blue components are primarily detected in the junction near the surface while the red component is detected in the junction farther away from the surface of the substrate. This arrangement is based on the premise that light of a short wave length does not reach the deep part of a semiconductor substrate. In accordance with this arrangement, however, the spectral characteristics for the color detectable by the two sensors are not constant. Accordingly, errors result.

Conceivably such errors may be avoided, and the spectral characteristics be made constant and reliable, by forming the light receiving faces of the R and B sensors into shapes such as shown in FIG. 1 of the accompanying drawings. In FIG. 1, the R sensor has a light receiving face R20, and the B sensor a light receiving face B20. The two light receiving faces are arranged independently of each other on the same plane. The centers R-C and B-C of the sensitive portion of these light receiving faces are completely separated from each other.

With the sensors arranged in this manner, when a part of the camera casing 9 blocks or eclipses light from the light source, as shown in FIG. 2, the ratio of the outputs of these sensors is erroneous and hinders accurate color temperature measurement. This problem is most acute when the boundary line Y between the light receiving faces R20 and B20, an edge of the camera casing and the light source, which are shown in FIG. 2, happen to be in alignment.

SUMMARY OF THE INVENTION

It is therefore a principle object of the present invention to provide a color information detecting device capable of eliminating the shortcomings of the prior art devices described.

It is another object of the invention to provide a color information detecting device not readily affected by a camera part blocking the light source.

It is a further object of the invention to provide a color information detecting device permitting white balance control with little error.

To attain these objects, a preferred embodiment of the invention is arranged such that the light receiving faces of detectors which detect different colors are arranged approximately on the same plane and have their sensitivity distribution areas overlapping each other. The device is invulnerable to the previously mentioned eclipse of light from a source to ensure accurate detection of color components. Further, in accordance with this invention, color temperature information is obtained by performing a computation on the outputs of the detectors. The color balance of a color image sensor is controlled on the basis of the information thus obtained. Therefore, an image sensing system arranged according to the invention has little error and is highly practicable.

These and further objects and features of the invention will become apparent from the following detailed description of preferred embodiments thereof taken in connection with the accompanying drawings.

DETAILED DESCRIPTION OF THE PREFERRED EMBODIMENTS

The following description illustrates several embodiments of the invention with reference to the accompanying drawings.

Figure 1:
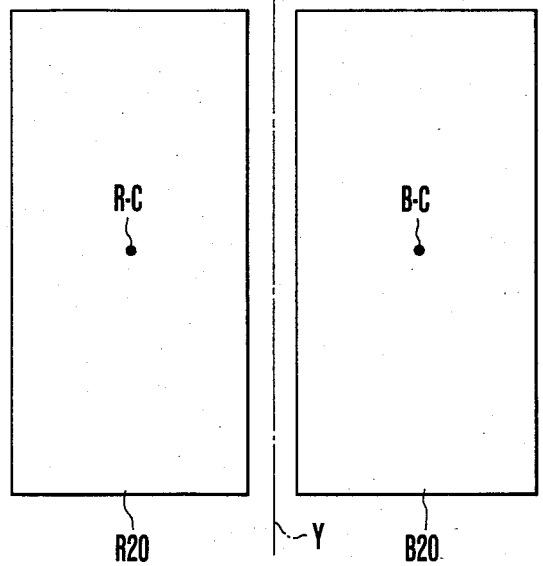
FIG. 1 is an illustration of an example of arrangement of the color information detecting device of the prior art.
Figure 2:
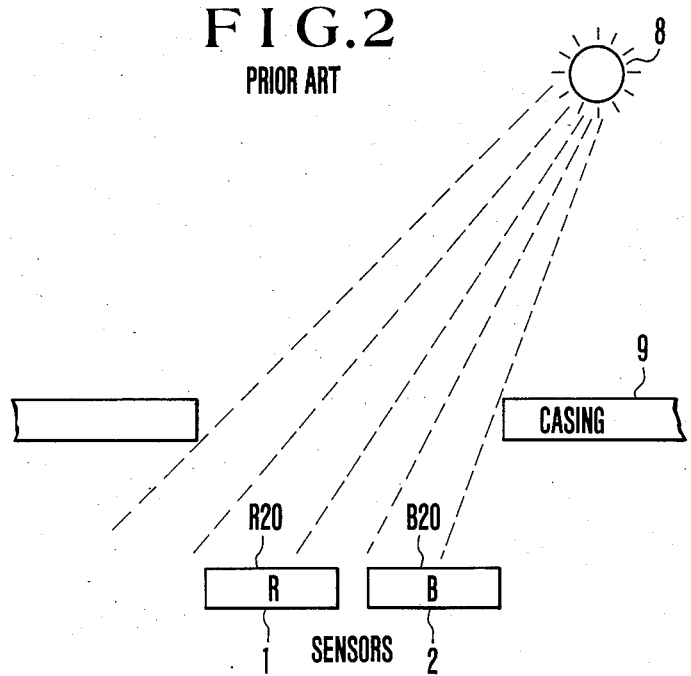
FIG. 2 is an illustration showing a shortcoming of the prior art device.
Figure 3:
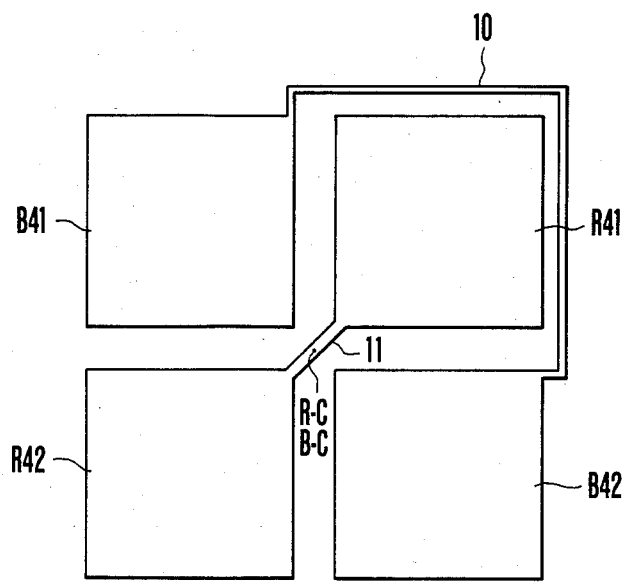
FIG. 3 is an illustration showing a color information detecting device arranged as a first embodiment of the present invention.
Figure 4:
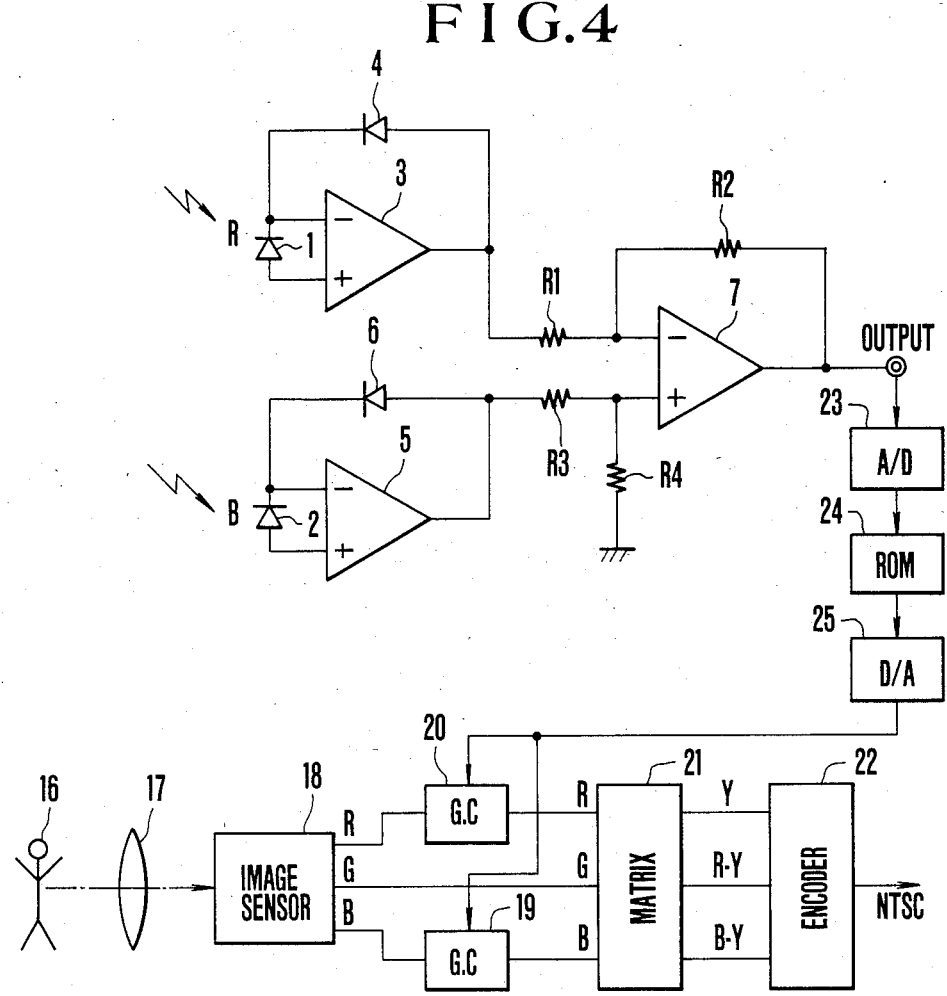
FIG. 4 is a circuit diagram showing by way of example the arrangement of a color temperature detecting circuit according to the invention.

FIG. 3 shows the arrangement of the light receiving faces of a color information detecting device according to the invention as a first embodiment thereof. FIG. 4 shows the circuit arrangement of the color information detecting device.

The embodiment is provided with a B sensor 2 which includes light receiving or photo-sensitive faces B41 and B42. The light receiving faces B41 and B42 serve as detectors for detecting blue (B) color light information. An R sensor 1 has light receiving faces R41 and R42 which function as detectors for detecting red (R) color light information. These light receiving faces of the two sensors are arranged on about the same plane independently of each other. The light receiving faces B41 and B42 are electrically connected in common to a connection line 10. The other pair of light receiving faces R41 and R42 are electrically connected in common to a connection line 11.

Blue color filters are disposed in front of the light receiving faces B41 and B42, while red color filters are disposed in front of the light receiving faces R41 and R42. The output terminals of the R and B sensors 1 and 2 are connected to the amplifiers 3 and 5 as shown in FIG. 4. The detection outputs of these sensors 1 and 2 are amplified by the amplifiers 3 and 5. The amplified detection outputs are then logarithmically compressed by diodes 4 and 6 into R and B signals with their dynamic ranges compressed respectively. The R and B signals thus obtained from the amplifiers 3 and 5 are supplied to a subtracter consisting of resistors R1–R4 and an amplifier 7. A ratio of these signals is then obtained from the subtracter. Color temperature information determined according to the ratio of the R and B signals is converted into a digital signal by an analog-to-digital converter 23 (hereinafter referred to as A/D converter). The output of the A/D converter 23 is used as an address and a corresponding datum is read out of data stored in a ROM 24 (read only memory). The datum thus read out is converted into an analog signal by a digital-to-analog converter 25 (hereinafter referred to as D/A converter). The analog signal thus obtained is supplied as a gain control signal to gain control amplifiers 19 and 20. The illustration of FIG. 4 further includes an object 16 to be photographed; a taking lens 17; and an image sensor 18. The image sensor 18 produces R(red), G(green) and B(blue) color signal components, which are read out separately from each other. The gain control amplifiers 19 and 20 are arranged for adjustment of the gains of R and B channels respectively.

A matrix circuit 21 is arranged to perform adding and subtracting operations on the R, G and B signals and to produce a luminance signal Y and color difference signals R-Y and B-Y. An encoder 22 modulates and arranges in multiple these signals Y, R-Y and B-Y to form a standard television signal, such as an NTSC signal. The gains of the gain control amplifiers 19 and 20 are controlled according to the color temperature. Therefore, the color balance between chroma signals can be stabilized irrespective of variations in the object to be photographed. For example, from the ROM 24, a control signal is produced to lower the gain of the gain control amplifier 20 and to raise that of the other amplifier 19 when the color temperature of the object decreases. Conversely, a control signal is produced to raise the gain of the amplifier 20 and to lower that of the amplifier 19 when the color temperature of the object increases. Further, in this embodiment, the center R-C of sensitivity distribution of the light receiving faces R41 and R42 which are electrically connected in common and the center B-C of sensitivity distribution of the light receiving faces B41 and B42 are located in the same position. More specifically, although the light receiving face of the R sensor and that of the B sensor are not overlapping in the direction of thickness, they can be considered to be virtually or equivalently overlapping each other in the direction of their common plane. Therefore, even in the event of some eclipsing influence on them, the adverse effect of it is minimized.

Figure 5:
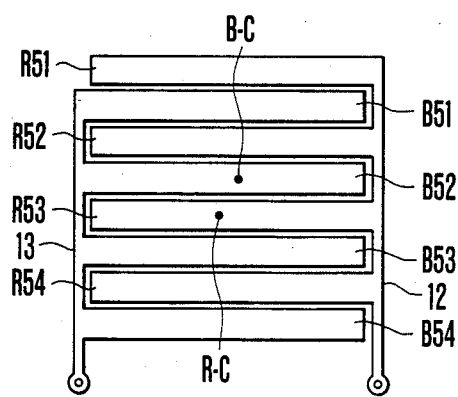
FIG. 5 is an illustration of a second embodiment of the invention.

FIG. 5 shows a second embodiment of the invention. In this case, both the R and B sensors are formed in a comb-like shape and are alternately arranged with each other to have their centers of sensitivity distribution located in approximately the same position. In FIG. 5, reference symbols R51–R54 denote the light receiving faces of the R sensor and B51–B54 the light receiving faces of the B sensor. The light receiving faces R51–R54 are electrically connected in common by a connection line 12 while the light receiving faces B51–B54 are electrically connected in common by another connection line 13. The connection lines 12 and 13 may be thus arranged to detect red color light and blue color light respectively. With the second embodiment arranged in this manner, the center R-C of sensitivity distribution of the R sensor and the center B-C of the B sensor are located approximately in the same position.

Further, in accordance with the arrangement of this embodiment, the centers of sensitivity distribution of the R and B sensors can adjusted to be more perfectly coincide with each other for furthering the advantageous effect of the invention by slightly increasing the light receiving area of the R or B sensor or by adjusting their positions.

Figure 6:
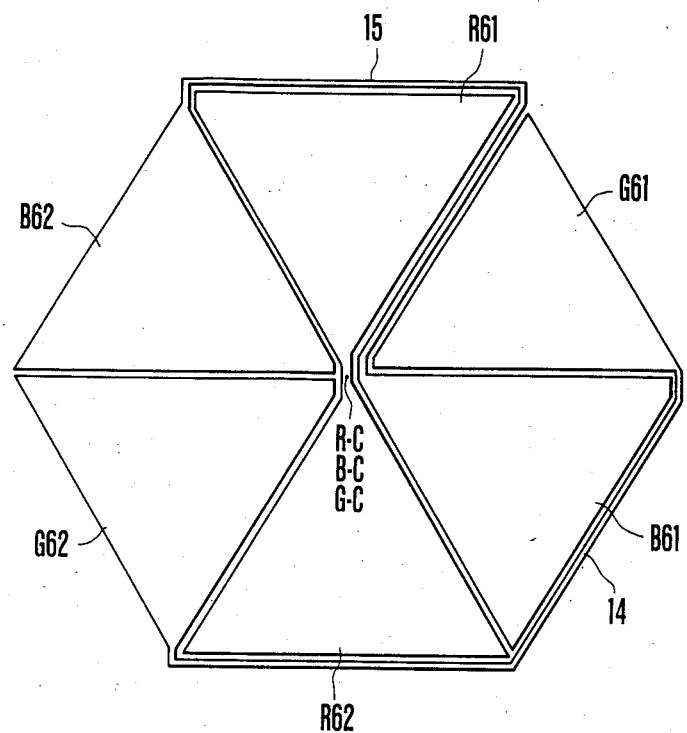
FIG. 6 is an illustration of a third embodiment of the invention.

FIG. 6 shows a third embodiment of the invention. An R sensor is formed by light receiving faces R61 and R62 and a G sensor by light receiving faces G61 and G62 for detecting a green color light (G). The light receiving faces G61 and G62 are electrically connected in common by a connection line 14. A B sensor is formed by light receiving faces B61 and B62 electrically connected in common by a connection line 15. The center R-C of sensitivity distribution of the R sensor, the center G-C of that of the G sensor and the center B-C of that of the B sensor are arranged to be located in the same position.

Figure 7:
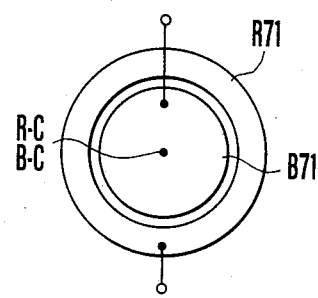
FIG. 7 is an illustration of a fourth embodiment of the invention.

FIG. 7 shows a fourth embodiment of the invention. R and B sensors are provided with light receiving faces R71 and B71. The centers R-C and B-C of sensitivity distribution of these light receiving faces are arranged to be located in the same position.

In the foregoing embodiments, the sensors are arranged to detect primary colors. However, they may of course arranged to detect any colors other than primary colors. Each specific color is arranged to be detected with a specific color filter disposed in front of the light receiving face of each sensor. However, different color lights may be arranged to be discriminated from each other by utilizing the physical properties of sensors.

The color information detecting device according to the invention, as described in the foregoing, is arranged to have a plurality of detectors. Each detector is provided with light receiving faces for detecting information on a different color light from each other detector. The detectors are disposed on the same plane independently of each other. The light receiving faces of each detector are electrically connected in common. The center of the sensitivity distribution of the light receiving faces of one detector is arranged to be located approximately in the same position as those of other detector, so that these detector can receive the light from the same light source in the same manner. Therefore, in the event that the light receiving faces from these detectors are illuminated unevenly by the light from the light source, any error that results from the uneven illumination is minimized.

What is claimed is:

1. A color information detecting device, comprising: a plurality of detecting means, each detecting means having light receiving faces arranged to detect information of a different color from other detecting means, the light receiving faces of each detecting means having a center of distribution of sensitivity, said plurality of detecting means being disposed on substantially the same plane independently of each other, the center of distribution of sensitivity of the light receiving faces of each detecting means being located in substantially the same position as the center of distribution of sensitivity of the light receiving faces of other detecting means.

2. A device according to claim 1, wherein said plurality of detecting means includes a red color sensor for detecting a red color component and a blue color sensor for detecting a blue color component.

3. A device according to claim 2, wherein said plurality of detecting means further include a green color sensor for detecting a green color component.

4. A device according to claim 1, wherein each of said detecting means is arranged to receive light through a color filter having a spectral characteristic, the spectral characteristic of each color filters being different.

5. A device according to claim 1, wherein each of said detecting means is provided with a plurality of light receiving faces.

6. A device according to claim 5, wherein said plurality of light receiving faces are arranged in symmetric positions and have centers of symmetry at substantially the same point.

7. A device according to claim 5, further comprising connecting means for connecting said plurality of light receiving faces within each of said detecting means in common.

8. A device according to claim 7, wherein said common connecting means for connecting the plurality of light receiving faces of each detecting means in common receives a specific color light component.

9. A device according to claim 5, including means for processing in common signals obtained from said plurality of light receiving faces of each detecting means.

10. A device according to claim 5, wherein said plurality of light receiving faces of each detecting means are arranged alternately with those of another detecting means.

11. A device according to claim 1, wherein the light receiving faces of said plurality of detecting means are arranged in symmetric shapes turnable on a substantially common point.

12. A device according to claim 1, further comprising computing means for performing a computation with the outputs of each of said plurality of detecting means relative to each other.

13. A device according to claim 12, wherein said computing means is arranged to obtain a ratio of the outputs of each of said plurality of detecting means.

14. A device according to claim 1, wherein each of said detecting means produces an output, and further comprising logarithmically compressing means for logarithmically compressing the outputs of said plurality of detecting means.

15. An image sensing device, comprising:
    (a) a plurality of detecting means for detecting and providing an output of information on a color light different from a color light information to be detected by other detecting means, said detecting means each having a plurality of light receiving faces, said light receiving faces being arranged on about the same plane independently of each other with their centers of sensitivity distribution arranged to overlap each other;
    (b) computing means for computing the outputs of said plurality of detecting means relative to each other and providing an output;
    (c) a color image sensor arranged to convert an optical image into a picture signal output including color or chroma signal components; and
    (d) control means for controlling the balance among the color or chroma signal components of the output of said color image sensor on the basis of the output of said computing means.

16. A device according to claim 15, wherein said plurality of detecting means includes a red color sensor for detecting a red color component and a blue color sensor for detecting a blue color component.

17. A device according to claim 15, wherein said plurality of detecting means further include a green color sensor for detecting a green color component.

18. A device according to claim 15, wherein each of said detecting means is arranged to receive light through a color filter having a spectral characteristic, the spectural characteristic of each color filter being different.

19. A device according to claim 15, wherein each of said detecting means includes a plurality of light receiving faces.

20. A device according to claim 19, wherein said plurality of light receiving faces are arranged in symmetric positions and have centers of symmetry at substantially the same point.

21. A device according to claim 19, further comprising connecting means for connecting said plurality of light receiving faces within each of said detecting means in common.

22. A device according to claim 21, wherein said common connecting means for connecting the plurality of light receiving faces of each detecting means in common receives a specific color light component.

23. A device according to claim 19, including means for processing in common signals obtained from said plurality of light receiving faces to each detecting means.

24. A device according to claim 19, wherein said plurality of light receiving faces of each detecting means are arranged alternately with those of another detecting means.

25. A device according to claim 15, wherein the light receiving faces of said plurality of detecting means are arranged in symmetric shapes turnable on an approximately common point.

26. A device according to claim 15, wherein said computing means is arranged to obtain a ratio of the outputs of each of said plurality of detecting means.

27. A device according to claim 15, further comprising logarithmically compressing means for logarithmically compressing outputs of said plurality of detecting means.

28. A device according to claim 15, wherein the centers of sensitivity distribution of the light receiving faces of each detecting means approximately coincide with each other.

29. A device according to claim 15, wherein said control means includes gain control means for controlling a gain of each color or chroma signal component of the output of said color image sensor.

* * * * *